United States Patent [19]
Horning et al.

[11] Patent Number: 6,038,402
[45] Date of Patent: Mar. 14, 2000

[54] METHOD OF DISENGAGING ANTI-BACKUP PAWL FROM FILM WINDER TO PERMIT UNEXPOSED FILMSTRIP TO BE PREWOUND FROM FILM CARTRIDGE DURING MANUFACTURE OF ONE-TIME-USE CAMERA

[75] Inventors: Randy E. Horning, LeRoy; James G. Rydelek, Henrietta, both of N.Y.

[73] Assignee: Eastman Kodak Company, Rochester, N.Y.

[21] Appl. No.: 09/234,867

[22] Filed: Jan. 21, 1999

[51] Int. Cl.[7] ............................ G03B 17/02; G03B 1/00
[52] U.S. Cl. ............................ 396/6; 396/395; 396/396; 396/411; 396/536
[58] Field of Search ............................ 396/6, 395, 396, 396/411, 535, 536

[56] References Cited

U.S. PATENT DOCUMENTS

| 554,769 | 2/1896 | Brownell | 242/118.62 |
|---|---|---|---|
| 579,949 | 4/1897 | Brownell | 396/385 |
| 1,050,785 | 1/1913 | Austin et al. | 242/118.4 |
| 1,144,267 | 6/1915 | VanSickle et al. | 396/502 |
| 4,991,786 | 2/1991 | Cloutier et al. | 396/512 |
| 5,063,400 | 11/1991 | Takei et al. | 396/6 |
| 5,202,713 | 4/1993 | Nakai et al. | 396/6 |
| 5,329,330 | 7/1994 | Sakai et al. | 396/6 |
| 5,349,410 | 9/1994 | Kamata | 396/6 |
| 5,453,804 | 9/1995 | Norris et al. | 396/31 |
| 5,517,270 | 5/1996 | Balling | 396/536 |
| 5,550,608 | 8/1996 | Smart et al. | 396/538 |
| 5,579,070 | 11/1996 | Smart et al. | 396/538 |
| 5,581,316 | 12/1996 | Kamoda et al. | 396/6 |
| 5,581,321 | 12/1996 | Boyd | 396/535 |
| 5,608,485 | 3/1997 | Kataoka et al. | 396/514 |
| 5,614,977 | 3/1997 | Smart | 396/395 |
| 5,682,570 | 10/1997 | Wakabayashi | 356/536 |
| 5,689,745 | 11/1997 | Zander et al. | 396/425 |
| 5,761,542 | 6/1998 | Lamphron et al. | 396/6 |

*Primary Examiner*—Eddie C. Lee
*Attorney, Agent, or Firm*—Roger A. Fields

[57] ABSTRACT

A method of disengaging an anti-backup pawl from a film winding thumbwheel to permit an unexposed filmstrip to be prewound from a film cartridge during original manufacture or recycling of a one-time-use camera has the steps of: depressing a movable free end of the anti-backup pawl to pivot the anti-backup pawl at a fulcrum support between the free end and a movable opposite end of the anti-backup pawl that engages the film winding thumbwheel, in order to disengage the opposite end from the film winding thumbwheel; and holding the free end depressed to maintain the opposite end disengaged from the film winding thumbwheel, in order to permit the film winding thumbwheel to be rotated in engagement with a film spool in the film cartridge when the unexposed filmstrip is prewound from the film cartridge.

3 Claims, 8 Drawing Sheets

METHOD OF DISENGAGING ANTI-BACKUP PAWL FROM FILM WINDER TO PERMIT UNEXPOSED FILMSTRIP TO BE PREWOUND FROM FILM CARTRIDGE DURING MANUFACTURE OF ONE-TIME-USE CAMERA

CROSS REFERENCE TO RELATED APPLICATION

Reference is made to commonly assigned copending application Ser. No. 09/234,763, entitled ONE-TIME-USE CAMERA WITH ANTI-BACKUP PAWL FOR FILM WINDER INCAPACITATED WHEN FILM DOOR OPENED TO REMOVE FILM CARTRIDGE and filed Jan. 21, 1999 in the names of Randy E. Horning, Raymond P. Chapman & James G. Rydelek.

The cross-referenced application is incorporated in this application.

FIELD OF THE INVENTION

The invention relates generally to the field of photography, and in particular to one-time-use cameras. More specifically, the invention relates to a method of disengaging an anti-backup pawl from a film winding thumbwheel to permit an unexposed filmstrip to be prewound from a film cartridge during original manufacture or recycling of a one-time-use camera.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a cartridge receiving chamber, an unexposed film roll prewound on a film spool in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Problem

During original manufacture or recycling of the one-time-use camera, an unexposed filmstrip is prewound from the film cartridge in the cartridge receiving chamber onto the film spool in the film supply chamber to form the unexposed film roll on that spool. A resilient anti-backup pawl for the film winding thumbwheel must be disengaged from the thumbwheel to permit the thumbwheel to be unwindingly rotated in engagement with the film spool inside the film cartridge when the unexposed filmstrip is prewound from the film cartridge. A prior art method of manually disengaging the anti-backup pawl from the thumbwheel involves inserting a disengaging tool behind the anti-backup pawl and prying the anti-backup pawl outwardly from the thumbwheel. This prior art method is illustrated in FIGS. 1–4 of the drawings. As shown in the FIG. 1, a cantilevered anti-backup pawl 10 is positioned in a slot 12 in the opaque rear cover part 14 of the one-time-use camera 16, and it has a fixed (non-movable) end 18 integrally connected with the rear cover part 14 and a free (movable) or pawl end 20 engaging the thumbwheel 22. The thumbwheel 22 is rotatably supported on the main body part 24 and protrudes outwardly (rearwardly) from the slot 12. To disengage the pawl end 20 from the thumbwheel 22, a disengaging tool 26 is first partially inserted into the slot 12 as shown in FIG. 2, and is then pivoted clockwise in FIG. 3 behind the pawl end to pry the pawl end away from the thumbwheel. While the pawl end 20 is held separated from the thumbwheel 22, a rotation tool 28 is coaxially engaged with a film spool 30 in the film supply chamber 32 of the main body part 24 and is rotated to wind the unexposed filmstrip 34 onto that spool from the film cartridge 36 in the cartridge receiving chamber 38 of the main body part. See FIG. 4.

The Cross-Referenced Application

The incorporated cross-referenced application discloses an opaque rear cover part for a one-time-use camera comprising a door cover portion and a remaining cover portion that are connected to permit the door cover portion to be pivoted open relative to the remaining cover portion, a slot having opposite ends that longitudinally extends between the door cover portion and the remaining cover portion, and an anti-backup pawl supported in the slot for engaging a film winding thumbwheel that is to be located in the slot. The anti-backup pawl has respective connections with the door cover portion and the remaining cover portion that project between the opposite ends of the slot from the anti-backup pawl to the door cover portion and the remaining cover portion to support the anti-backup pawl in the slot. One of the connections is constructed to be torn apart when the door cover portion is pivoted open relative to the remaining cover portion in order that the anti-backup pawl will no longer be connected to the door cover portion or the remaining cover portion.

SUMMARY OF THE INVENTION

According to one aspect of the invention, there is provided a method of disengaging an anti-backup pawl from a film winding thumbwheel to permit an unexposed filmstrip to be prewound from a film cartridge during original manufacture or recycling of a one-time-use camera. The method comprises the steps of:

depressing a movable free end of the anti-backup pawl to pivot the anti-backup pawl at a fulcrum support between the free end and a movable opposite end of the anti-backup pawl that engages the film winding thumbwheel, in order to disengage the opposite end from the film winding thumbwheel; and holding the free end depressed to maintain the opposite end disengaged from the film winding thumbwheel, in order to permit the film winding thumbwheel to be rotated in engagement with a film spool in the film cartridge when the unexposed filmstrip is prewound from the film cartridge.

According to another aspect of the invention, there is provided an opaque rear cover part for a one-time-use camera comprising an integral anti-backup pawl having a movable pawl end for engaging and disengaging a film winding thumbwheel. The anti-backup pawl has a movable free end and at least one fulcrum support that is arranged between the free end and the pawl end to permit the anti-backup pawl to be pivoted at the fulcrum support to move the pawl end to disengage the film winding thumbwheel when the free end is moved.

DETAILED DESCRIPTION OF THE INVENTION

Figure 1:
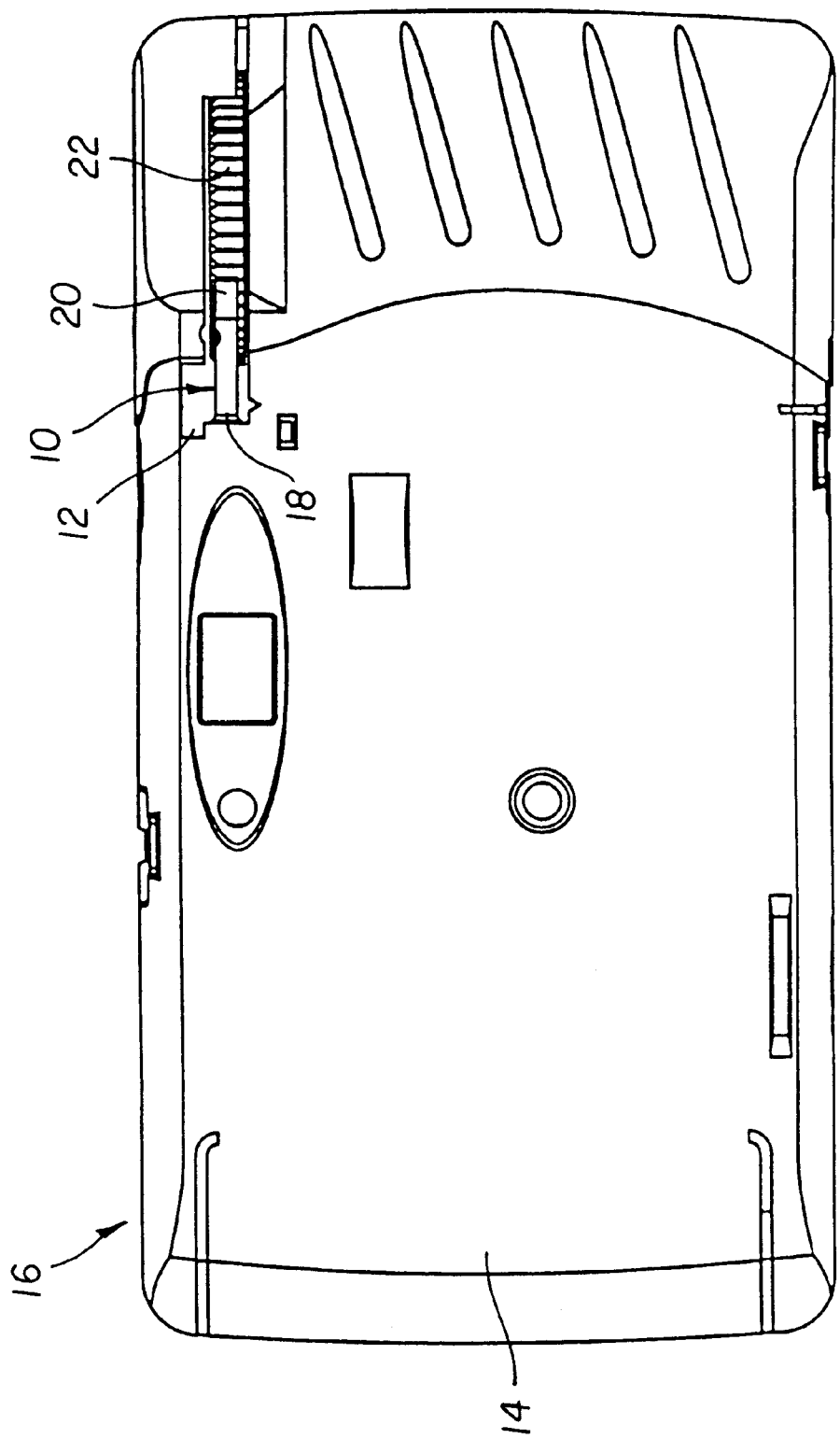
FIG. 1 a rear elevation view of a one-time-use camera with a prior art anti-backup pawl.
Figure 2:
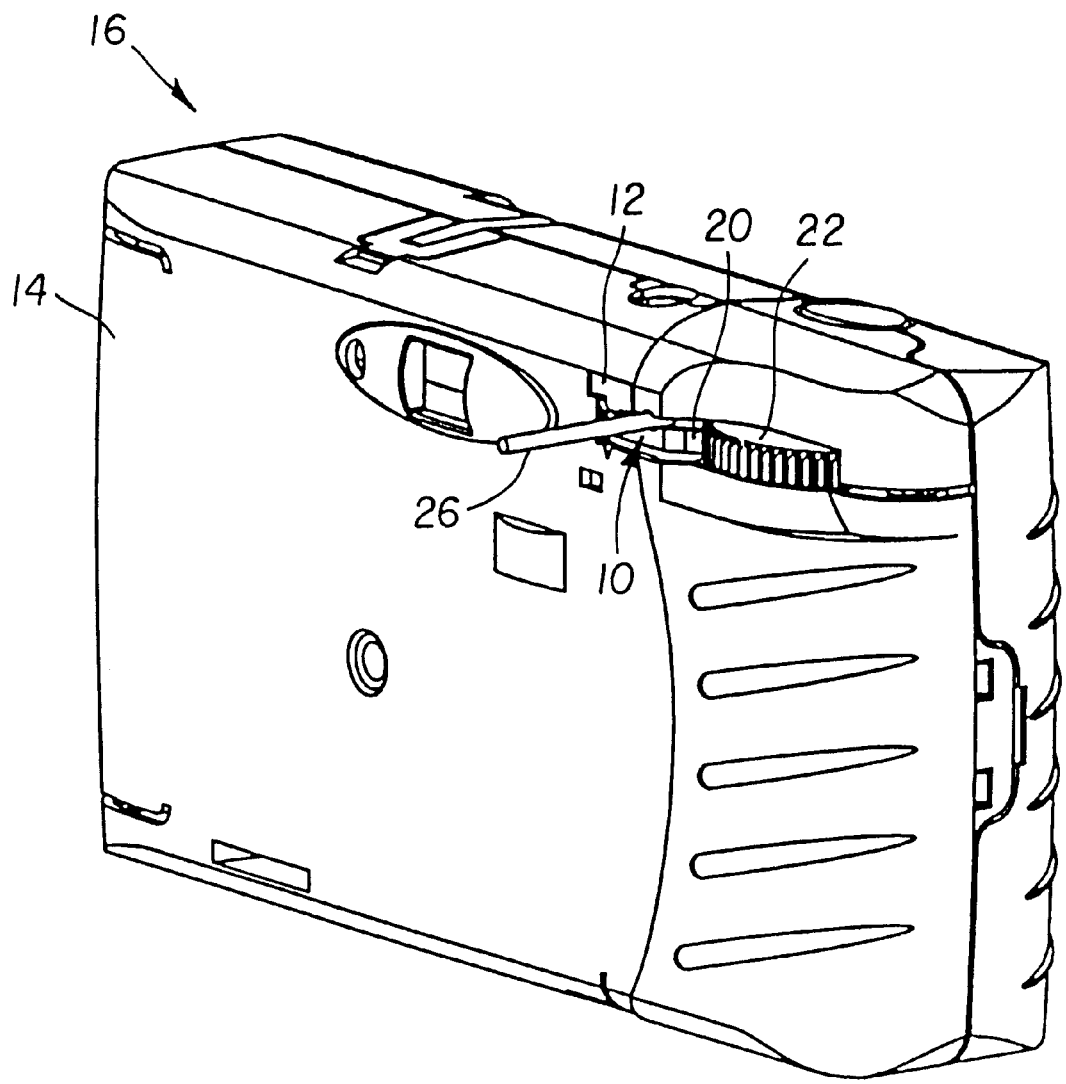
FIGS. 2 and 3 are rear perspective views of the camera, showing a prior art method of manually disengaging the anti-backup pawl from a film winding thumbwheel.
Figure 3:
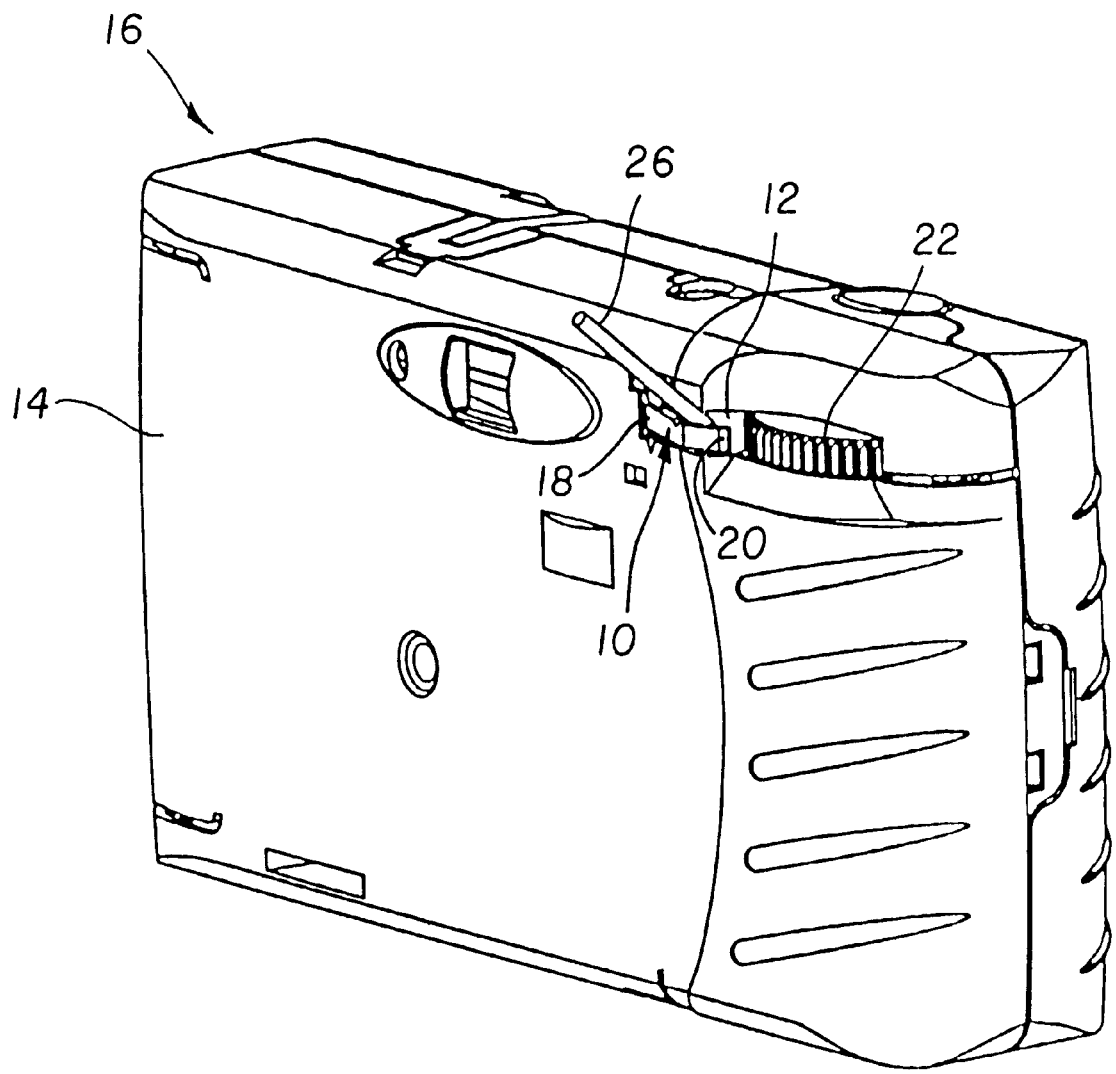
Figure 4:
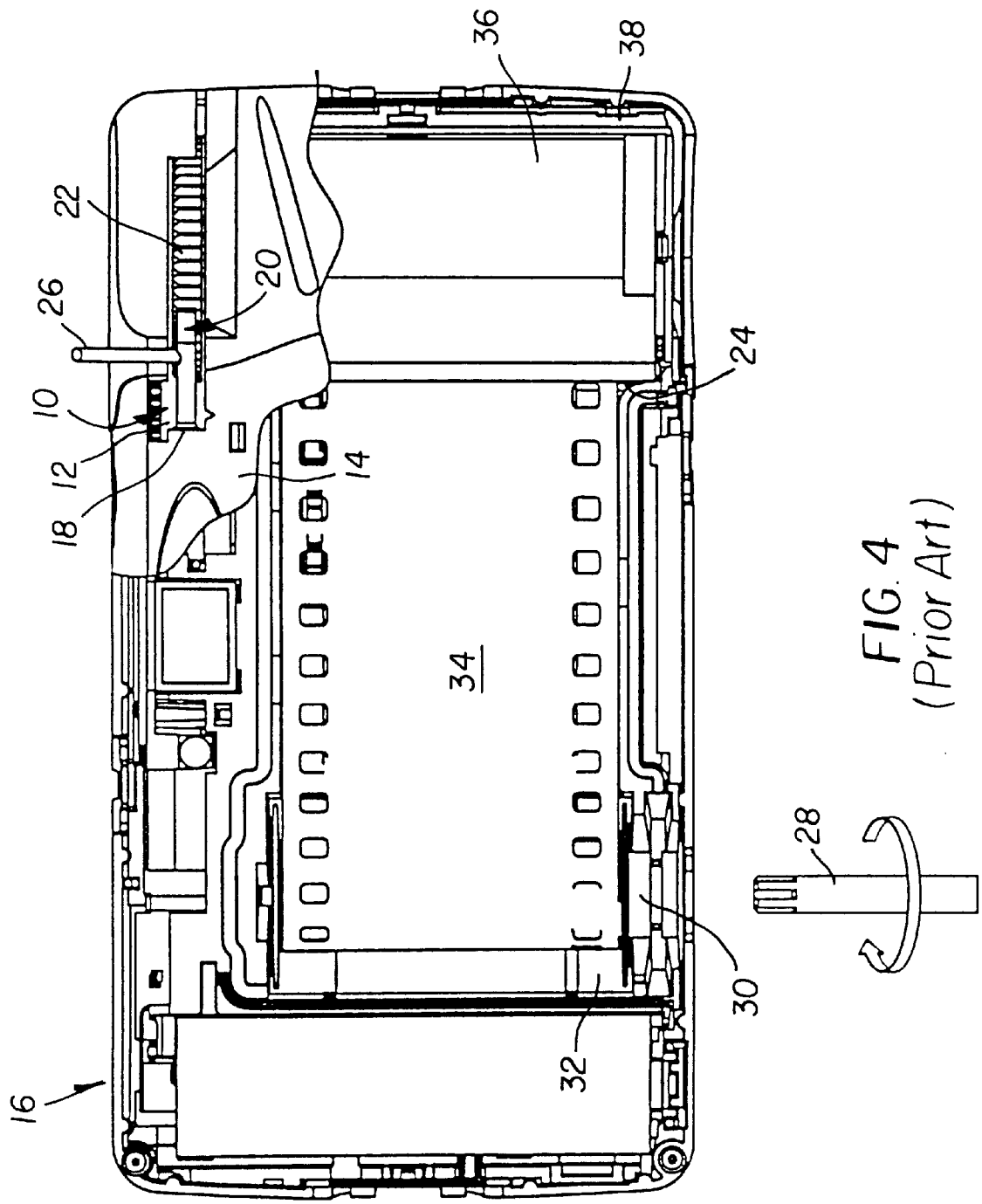
FIG. 4 is a rear elevation view of the camera with a rear cover part removed, showing how an unexposed filmstrip is prewound from a film cartridge in a cartridge receiving chamber onto a film spool in a film supply chamber to form an unexposed film roll on that spool.
Figure 5:
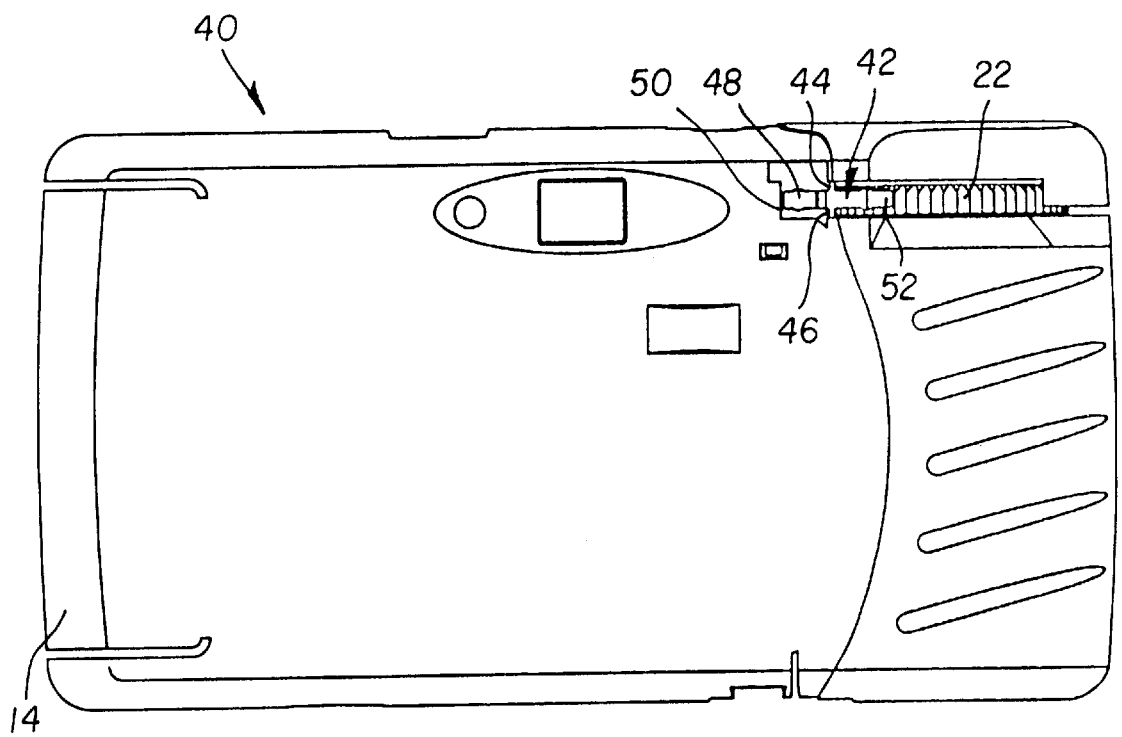
FIG. 5 is a rear elevation view of a one-time-use camera with a another anti-backup pawl that is a preferred embodiment of the invention.
Figure 6:
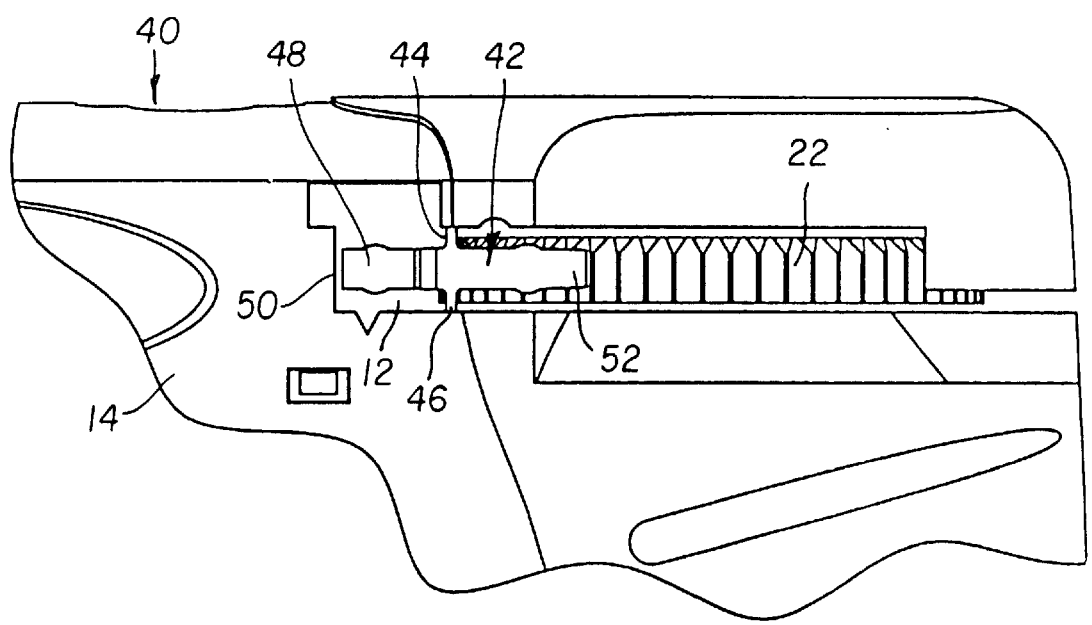
FIG. 6 is an enlarged view of the anti-backup pawl.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 5–8 show a one-time-use camera 40 with an anti-backup pawl 42. The one-time-use camera 40 is similar to the prior art camera shown in FIGS. 1–4, except that an anti-backup pawl 42 is different than the anti-backup pawl 10 in the prior art camera. Thus, in FIGS. 5–8 identical reference numbers as in FIGS. 1–4 are used to indicate the slot 12 in the opaque rear cover part 14, and the film winding thumbwheel 22 that protrudes outwardly (rearwardly) from the slot.

Figure 7:
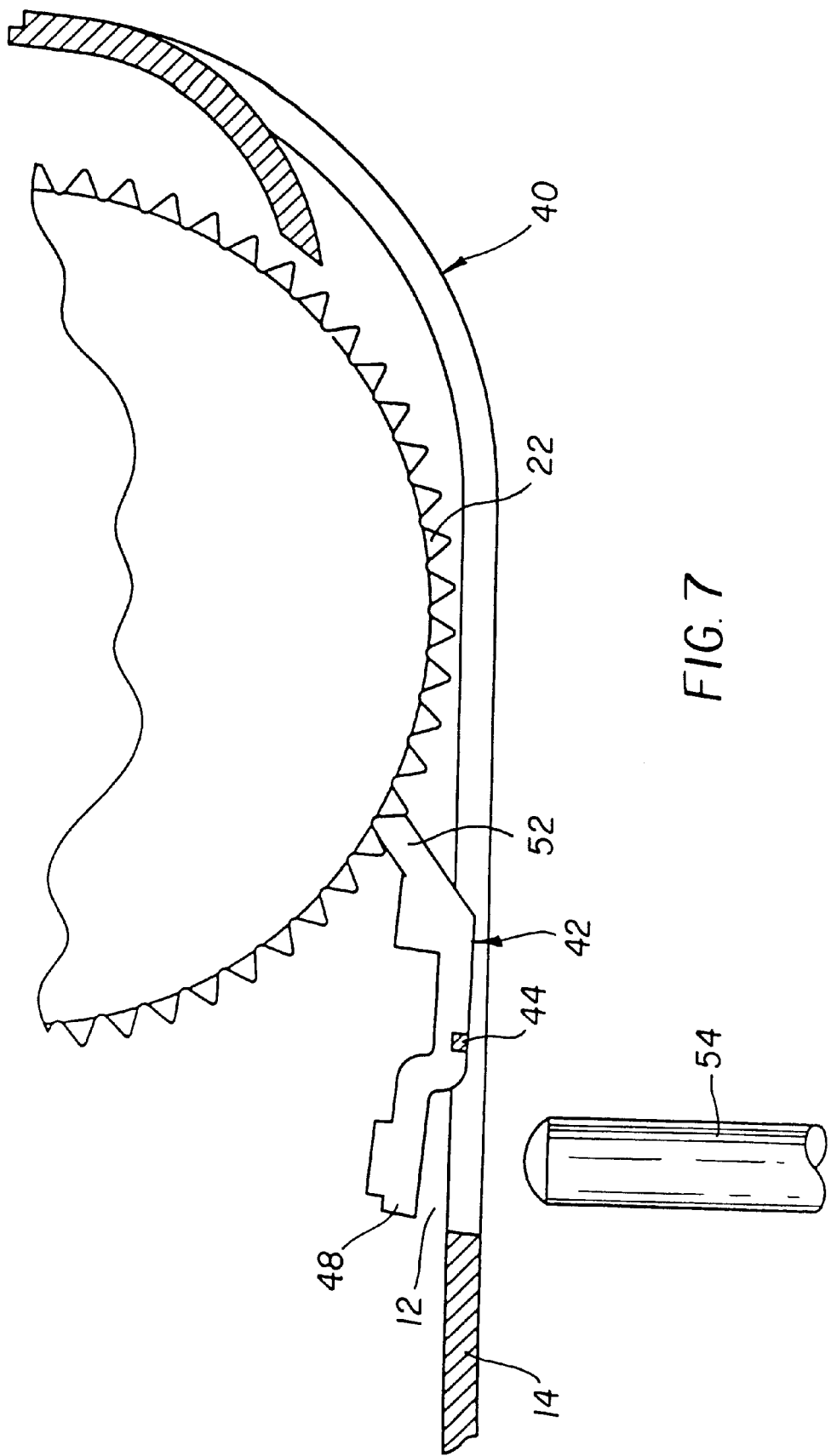
FIGS. 7 and 8 are top sectional views of the anti-backup pawl, showing a new method of manually disengaging the anti-backup pawl from the film winding thumbwheel.
Figure 8:
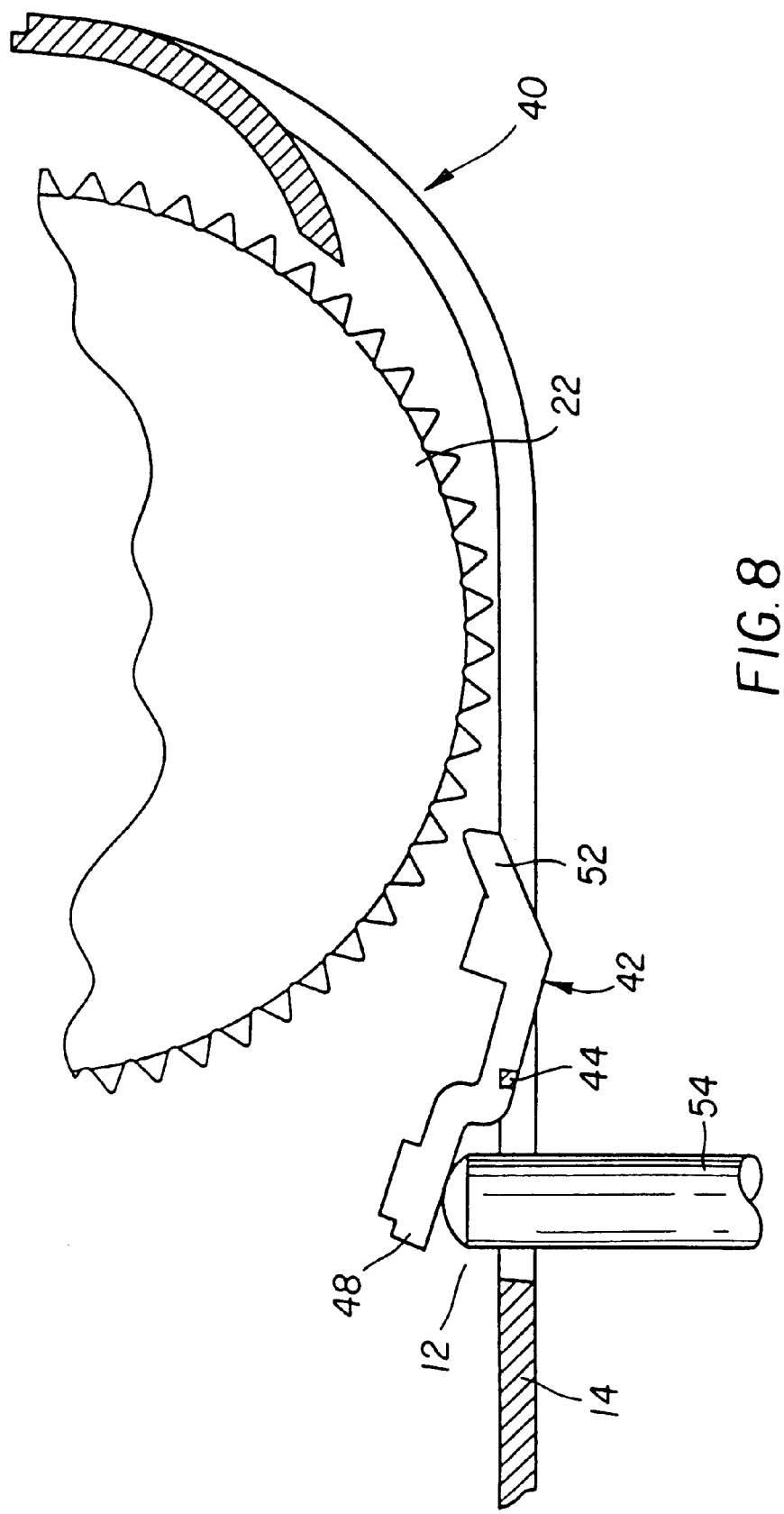

The anti-backup pawl 42 is identical to one disclosed in the incorporated cross-referenced application, and it has an integral pair of flexible fulcrum support connections 44 and 46 with the rear cover part 14 in the slot 12. See FIG. 6. A free (movable) end 48 of the anti-backup pawl 42 is located opposite one end 50 of the slot 12. Another free (movable) end, i.e. the pawl end 52, engages the thumbwheel 22 to prevent its unwinding rotation. As shown in FIGS. 7 and 8, The fulcrum support connections 44 and 46 are arranged between the free end 48 of the anti-backup pawl 42 and the pawl end 52 of the anti-backup pawl, in the slot 12, to permit the anti-backup pawl to be pivoted at the fulcrum support connections to move the free end inwardly of the slot and to move the pawl end outwardly of the slot, in order to disengage the pawl end from the thumbwheel.

A method of disengaging the anti-backup pawl 42 from the film winding thumbwheel 22 to permit the unexposed filmstrip 34 to be prewound from the film cartridge 36 during original manufacture or recycling of the one-time-use camera 40 is shown in FIGS. 7 and 8. The method comprises the steps of:

manually pushing a disengaging tool 54 against the free end 48 of the anti-backup pawl 42 to pivot the anti-backup pawl at the fulcrum support connections 44 and 46 and depress the free end inwardly of the slot 12 and move the pawl end 52 outwardly of the slot, in order to disengage the pawl end from the thumbwheel; and holding the disengaging tool against the free end to maintain the pawl end retracted from the thumbwheel, in order to permit the thumbwheel to be rotated in engagement with the film spool (not shown) in the film cartridge when the unexposed filmstrip is prewound from the film cartridge.

The invention has been described with reference to a preferred embodiment. However, it will be appreciated that variations and modifications can be effected by a person of ordinary skill in the art without departing from the scope of the invention.

PARTS LIST 10. anti-backup pawl
12. slot
14. rear cover part
16. one-time-use camera
18. fixed end
20. pawl end
22. thumbwheel
24. main body part
26. disengaging tool
28. rotation tool
30. film spool
32. film supply chamber
34. unexposed filmstrip
36. film cartridge
38. cartridge receiving chamber
40. one-time-use camera
42. anti-backup pawl
44. fulcrum support connection
46. fulcrum support connection
48. free end
50. one end
52. pawl end
54. disengaging tool

What is claimed is:

1. An opaque rear cover part for a one-time-use camera comprising an integral anti-backup pawl having a movable pawl end for engaging and disengaging a film winding thumbwheel, is characterized in that:

said anti-backup pawl has a movable free end, and has at least one fulcrum that is integrally connected with said anti-backup pawl to be an integral part of the anti-backup pawl, that is integrally connected with said rear cover part, and that is arranged between said free end and said pawl end to permit said anti-backup pawl to be pivoted at said fulcrum to move said pawl end to disengage the film winding thumbwheel when said free end is moved.

2. An opaque rear cover part for a one-time-use camera having a slot, and an anti-backup pawl supported in said slot and having a pawl end movable to engage and disengage a film winding thumbwheel that is placed in said slot, is characterized in that:

said anti-backup pawl has a free end that is movable inwardly of said slot and at least one fulcrum that is integrally connected with said rear cover part in said slot and that is arranged between said free end and said pawl end to permit said anti-backup pawl to be pivoted at said fulcrum to move said pawl end outwardly of said slot when said free end is moved inwardly of said slot, in order to disengage said pawl end from the film winding thumbwheel.

3. A one-time-use camera comprising an opaque rear cover part having a slot, a film winding thumbwheel rotatable in said slot, and an anti-backup pawl supported in said slot and having a pawl end engaging said film winding thumbwheel that is movable to disengage said thumbwheel, is characterized in that:

said anti-backup pawl has a free end that is movable inwardly of said slot, and has at least one flexible fulcrum that is integrally connected with said anti-backup pawl to be an integral part of the anti-backup pawl, that is integrally connected with said rear cover part in said slot, and that is arranged between said free end and said pawl end to permit said anti-backup pawl to be pivoted at said fulcrum to move said pawl end outwardly of said slot when said free end is moved inwardly of said slot, in order to disengage said pawl end from said film winding thumbwheel.

* * * * *